US008451262B2

(12) United States Patent
Lee et al.

(10) Patent No.: US 8,451,262 B2
(45) Date of Patent: May 28, 2013

(54) METHOD OF DRIVING A DISPLAY PANEL, AND DISPLAY APPARATUS FOR PERFORMING THE METHOD

(75) Inventors: Jae-Hoon Lee, Seoul (KR); Chang-Soo Lee, Uijeongbu-si (KR); Hoi-Sik Moon, Cheonan-si (KR); Young-su Han, Incheon (KR)

(73) Assignee: Samsung Display Co., Ltd. (KR)

( * ) Notice: Subject to any disclaimer, the term of this patent is extended or adjusted under 35 U.S.C. 154(b) by 796 days.

(21) Appl. No.: 12/625,839

(22) Filed: Nov. 25, 2009

(65) Prior Publication Data

US 2010/0128028 A1 May 27, 2010

(30) Foreign Application Priority Data

Nov. 27, 2008 (KR) ............................ 2008-0118680
Jul. 9, 2009 (KR) ............................ 2009-0062488

(51) Int. Cl.
*G06F 3/038* (2006.01)

(52) U.S. Cl.
USPC .......................................................... 345/214

(58) Field of Classification Search
None
See application file for complete search history.

(56) References Cited

U.S. PATENT DOCUMENTS

| | | | | |
|---|---|---|---|---|
| 5,841,411 | A * | 11/1998 | Francis | 345/58 |
| 2001/0024199 | A1* | 9/2001 | Hughes et al. | 345/204 |
| 2003/0090602 | A1 | 5/2003 | Kim | |
| 2006/0071883 | A1* | 4/2006 | Oh | 345/76 |
| 2006/0114209 | A1* | 6/2006 | Kim et al. | 345/94 |
| 2007/0115274 | A1* | 5/2007 | Shih | 345/211 |
| 2007/0164957 | A1 | 7/2007 | Hsieh et al. | |
| 2009/0009454 | A1* | 1/2009 | Urisu | 345/87 |

FOREIGN PATENT DOCUMENTS

WO 97/44774 A2 11/1997

OTHER PUBLICATIONS

Extended European Search Report for Application No. 09014719.0-2205 dated Sep. 7, 2011.

* cited by examiner

*Primary Examiner* — Adam R Giesy
(74) *Attorney, Agent, or Firm* — Cantor Colburn LLP

(57) ABSTRACT

Disclosed is a method of driving a display panel, which includes a plurality of data lines, a plurality of gate lines, a first pixel column electrically connected to an N-th gate line and a second pixel column electrically connected to an (N+1)-th gate line adjacent to the N-th gate line (wherein N is a natural number). In the method, compensation data of the first pixel for compensating for a kickback deviation between the first and second pixel columns is generated using first data and second data corresponding to the first and second pixel columns, respectively. The compensation data of the first pixel column and the second data of the second pixel column are converted to data voltages of an analog type to output the data voltages to the data lines.

16 Claims, 9 Drawing Sheets

| | | P2_GLN | | | | | | | | |
|---|---|---|---|---|---|---|---|---|---|---|
| | | 0 | 8 | 16 | 24 | 32 | 40 | 48 | 56 | 64 |
| P1_GLN-1 | 0 | 0 | 0 | 0 | 0 | 0 | 0 | 0 | 0 | 0 |
| | 8 | 10 | 8 | 7 | 7 | 5 | 3 | 3 | 2 | 1 |
| | 16 | 25 | 19 | 16 | (15) | 13 | 11 | 10 | 8 | 7 |
| | 24 | 32 | 28 | 25 | 24 | 22 | 19 | 17 | 16 | 15 |
| | 32 | 40 | 37 | 34 | 33 | 32 | 27 | 24 | 24 | 23 |
| | 40 | 48 | 46 | 43 | 42 | 42 | 40 | 31 | 32 | 31 |
| | 48 | 56 | 55 | 52 | 51 | 50 | 50 | 48 | 40 | 39 |
| | 56 | 64 | 64 | 61 | 60 | 60 | 60 | 58 | 56 | 47 |
| | 64 | 64 | 64 | 64 | 64 | 64 | 64 | 64 | 64 | 64 |

LOOK UP TABLE

METHOD OF DRIVING A DISPLAY PANEL, AND DISPLAY APPARATUS FOR PERFORMING THE METHOD

PRIORITY STATEMENT

This application claims priority under 35 U.S.C. §119 to Korean Patent Application No. 2008-118680, filed on Nov. 27, 2008, and Korean Patent Application No. 2009-62488, filed on Jul. 9, 2009, in the Korean Intellectual Property Office (KIPO), the contents of which are herein incorporated by reference in their entirety.

BACKGROUND OF THE INVENTION

1. Field of the Invention

The present invention relates to a method of driving a display panel, and a display apparatus for performing the method. More particularly, the present invention relates to a method of driving a display panel which substantially improves a display quality thereof, and a display apparatus for performing the method.

2. Description of the Related Art

Generally, a liquid crystal display ("LCD") apparatus includes an LCD panel which displays an image by controlling an optical transmittance of liquid crystal molecules provided with light from a backlight assembly disposed below the LCD panel. The LCD panel typically includes data lines, gate lines crossing the data lines and pixels connected to the data lines and gate lines.

Recently, in order to reduce costs, a pixel structure for reducing the number of data driving circuits has been developed. For example, A gate driving circuit is disposed in a longitudinal side of a display panel and the data driving circuit is disposed in a latitudinal side so that the number of the data driving circuits may be decreased.

In the structure of the display panel described above, gate lines driving pixel columns (or pixel rows) adjacent to each other may be electrically connected to each other so that a charging time may be sufficiently obtained. However, a kickback deviation may be caused by parasitic capacitance between pixels disposed on both sides of the gate line between a pixel electrode and the gate line, when the above-described method is used. Therefore, afterimages and vertical stripe patterns may be generated on the display panel.

BRIEF SUMMARY OF THE INVENTION

Exemplary embodiments of the present invention provide a method of driving a display panel having a substantially reduced and/or effectively eliminated kickback deviation.

Exemplary embodiments of the present invention also provide a display apparatus for performing the method.

According to one aspect of the present invention, in a method of driving a display panel, wherein the display panel includes a plurality of data lines, a plurality of gate lines, a first pixel column electrically connected to an N-th gate line and a second pixel column electrically connected to an (N+1)-th gate line adjacent to the N-th gate line (wherein N is a natural number), the method comprising, compensation data of the first pixel for compensating for a kickback deviation between the first and second pixel columns is generated using first data and second data corresponding to the first and second pixel columns, respectively. The compensation data of the first pixel column and the second data of the second pixel column are converted to data voltages of an analog type to output the data voltages to the data lines.

According to another aspect of the present invention, a display apparatus includes a display panel, a kickback compensation part and a data driving part. The display panel includes a plurality of data lines, a plurality of gate lines, a first pixel column electrically connected to an N-th gate line and a second pixel column electrically connected to an (N+1)-th gate line adjacent to the N-th gate line (wherein N is a natural number). The kickback compensation part generates compensation data of the first pixel column for compensating for a kickback deviation between the first and second pixel columns using first data and second data respectively applied to the first and second pixel columns. The data driving part converts the compensation data of the first pixel column and the second data of the second pixel column to data voltages of an analog type to output the data voltages to the data lines. The gate driving part outputs a gate signal to the gate line.

Thus, according to exemplary embodiments of the present invention, first and second pixels adjacent to each other and electrically connected to gate lines different from each other compensate for a kickback deviation, and afterimages and vertical stripe patterns are thereby substantially reduced and/or effectively prevented.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
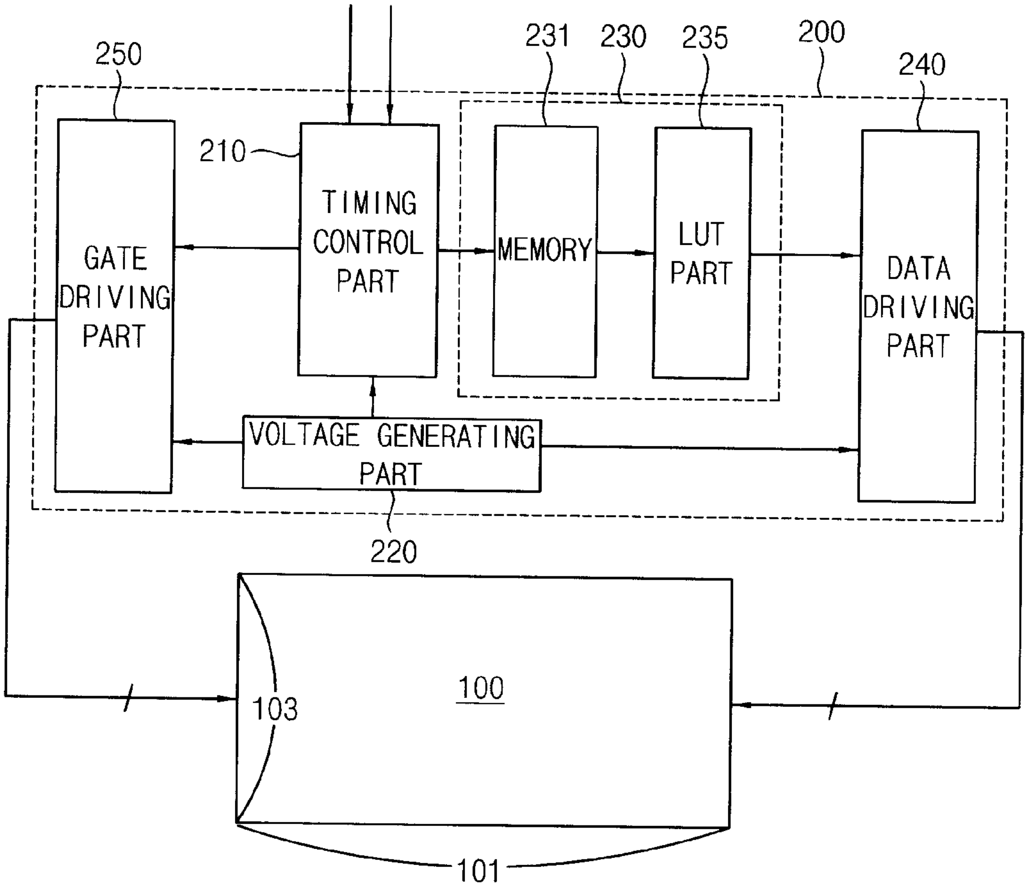
FIG. 1 is a block diagram of an exemplary embodiment of a display apparatus according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 2:
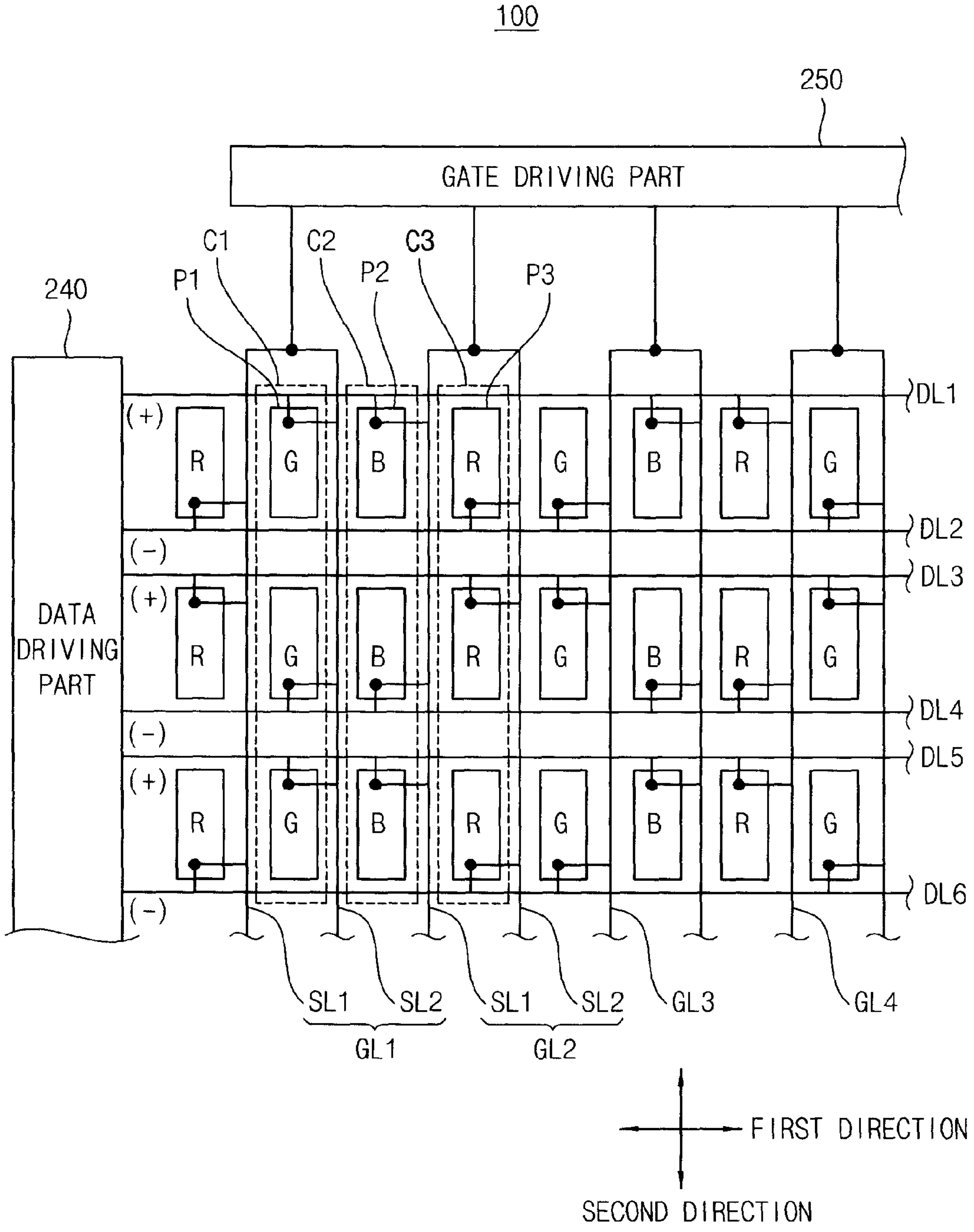
FIG. 2 is a plan view of an exemplary embodiment of a display panel of the display apparatus shown in FIG. 1.
Figure 3:
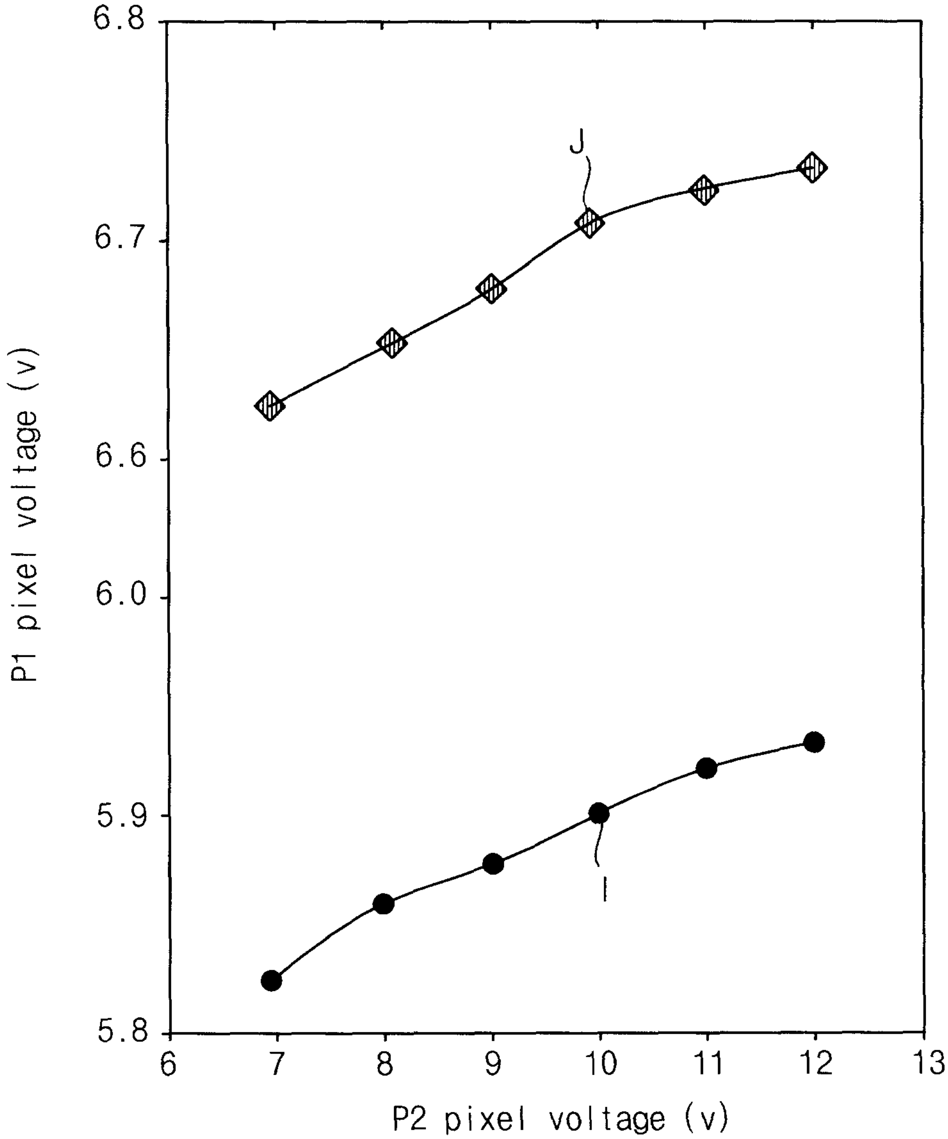
FIG. 3 is a graph of first pixel voltages versus second pixel voltages in pixels of the display panel shown in FIG. 2.

FIG. 1 is a block diagram of an exemplary embodiment of a display apparatus according to the present invention. FIG. 2 is a plan view of an exemplary embodiment of a display panel of the display apparatus shown in FIG. 1. FIG. 3 is a graph of first pixel voltages versus second pixel voltages in pixels of the display panel shown in FIG. 2.

Referring to FIGS. 1 and 2, a display apparatus according to an exemplary embodiment includes a display panel 100 and a panel driving part 200.

The display panel 100 according to an exemplary embodiment a frame type structure including a latitudinal 103 aligned in a first direction and a longitudinal side 101 aligned in a second direction substantially perpendicular to the first direction. The display panel 100 includes pixels P including a first pixel P1 and a second pixel P2, a plurality of gate lines GL1, GL2, GL3, . . . , GLn (where n is a natural number) and data lines DL1, DL2, DL3, . . . , DLm (where m is a natural number). The pixels are arranged in a matrix form having a plurality of columns and a plurality of rows.

The gate lines GL1, GL2, GL3, . . . , and GLn are extended in a second direction that is parallel with the latitudinal side 103 of the display panel 100, and may be arranged in a first direction that is parallel with the longitudinal side 101 of the display panel 100. Each of the gate lines GL1, GL2, GL3, . . . , and GLn may include a pair of sub-lines SL1 and SL2 electrically connected to each other. Each of the gate lines GL1, GL2, GL3, . . . , and GLn are electrically connected to the pixels included in two pixel columns adjacent to each other. For example, the pixels included in a second pixel column C2 and a third pixel column C3 adjacent to the second pixel column C2 are electrically connected to first and second sub-lines SL1 and SL2 of a second gate line GL2. A pair of sub-lines SL1 and SL2 of the second gate line GL2 is disposed adjacent to both length sides of the third pixel P3 included in the third pixel column C3.

The data lines DL1, DL2, DL3, . . . , and DLm are extended in the first direction of the display panel 100, and may be arranged in the second direction of the display panel 100. Two data lines adjacent to each other among the data lines DL1, DL2, DL3, . . . , and DLm are electrically connected to one of the pixel rows. For example, a first data line DL1 and a second data line DL2 are electrically connected to the pixels P of one pixel row, as shown in FIG. 2. The first data line DL1 and the second data line DL2 may receive data voltages having opposite phases to each other. The pixels P of one pixel row are selectively connected to the first data and the second data line DL1 and the second data line DL2 to be driven by an inversion driving method, as will be described in greater detail below.

The first and second pixel columns C1 and C2 include a first pixel P1 and a second pixel P2 electrically connected to the N-th (wherein N is a natural number) and (N+1)-th gate lines adjacent to each other. The first pixel P1 is electrically connected to the N-th gate line, and disposed between a pair of the sub-lines of the N-th gate line. The second pixel P2 is directly disposed adjacent to the first pixel as to be electrically connected (N+1)-th gate line. In additional, the second pixel P2 is disposed to one side of the (N+1)-th gate line. The first and second pixels P1 and P2 have factors causing a kickback voltage as shown in Table 1.

TABLE 1

| Factor Causing Kickback Voltage | First pixel (P1) | Second pixel (P2) |
|---|---|---|
| At a falling edge of an N-th gate signal (CGS) | ○ | ○ |
| At a falling edge of an N-th gate signal (CGP) | ○ | x |
| At a rising edge of an (N + 1)th gate signal (CPP) | ○ | x |

Referring to Table 1, a kickback voltage of the first pixel P1 is caused by a coupling capacitance CGS and a coupling capacitance CGP. The coupling capacitance CGS is generated between a gate electrode (not shown) and a source electrode (not shown) of a switching element (not shown) at the falling edge of the N-th gate signal and the coupling capacitance CGP is generated between the first gate line GL1 and a pixel electrode (not shown) of the first pixel P1 at the falling edge of the N-th gate signal. Additionally, the kickback voltage of the first pixel P1 is caused by a coupling capacitance CPP when the second pixel P2 is provided with a data voltage at the rising edge of the (N+1)-th gate signal. The coupling capacitance CPP is generated between pixel electrodes of the first pixel P1 and the second pixel P2.

When an area in which the pixel electrodes of the first pixel P1 and the second pixel P2 facing each other is increased according to longitudinal sides of the first and second pixels P1 and P2 facing each other, the coupling capacitance CPP which causes the kickback voltage increases. However, the kickback voltage of the second pixel P2 is caused by only a coupling capacitance CGS. The coupling capacitance CGS is generated between a second gate line GL2 and a first data line DL1 at the falling edge of the N-th gate signal. Therefore, factors causing the kickback voltage of the first pixel P1 and the second pixel P2 are different from each other and an undesirable kickback deviation thereby exists between the first pixel P1 and the second pixel P2. As a result, the first pixel P1 and the second pixel P2 have different common voltages VCOM due to the kickback deviation.

Moreover, when the first pixel P1 and the second pixel P2 are provided with a same data voltage, pixel voltages charged into the first pixel P1 and the second pixel P2 are different from each other due to the undesirable kickback variation which causes the different liquid crystal common voltages VCOM in the first pixel P1 and the second pixel P2.

FIG. 3 is graphs illustrating measured a pixel voltage charged in the first pixel P1 while changing a data voltage applied to the second pixel P2 when a data voltage of about 7 V is applied to the first pixel P1. Herein, the kickback voltage was about 6.6 V due to the coupling capacitance CGS between the gate electrode and the source electrode, the coupling capacitance CGP between the gate line and the pixel electrode was about 0.0138 pF, and the coupling capacitance CPP was about 0.014 pF. A first graph I illustrated the pixel voltage charged in the first pixel P1 when the coupling capacitance CGP existed between the gate line and the pixel electrode. A second graph J illustrated the pixel voltage charged in the first pixel P1, when the coupling capacitance CGP did not exist between the gate line and the pixel electrode. In comparing the first graph I with the second graph J, the pixel voltage charged in the first pixel P1 was changed according to the coupling capacitance CGP and the pixel voltage charged in the second pixel P2.

Therefore, to substantially reduce and/or effectively minimize the abovementioned defects caused by the kickback voltage deviation, the panel driving part 200 according to an exemplary embodiment includes a kickback compensation part 230, as shown in FIG. 1. The kickback compensation part 230 compensates for the kickback deviation between the first pixel P1 and the second pixel P2. Hereinafter, the kickback compensation part 230 according to an exemplary embodiment will be described in further detail with reference to FIGS. 1 and 2.

The panel driving part 200 includes a timing control part 210, a voltage generating part 220, a kickback compensation part 230, a data driving part 240 and a gate driving part 250.

The timing control part 210 receives an image signal and a synchronous signal from an external source (not shown). The timing control part 210 generates a timing control signal which controls a driving timing of the panel driving part 200 based on the synchronous signal. The timing control part 210 controls driving of the panel driving part 200. The timing control part 210 provides the kickback compensation part 230 with the image signal. In an exemplary embodiment, the image signal may include red ("R"), green ("G") and blue ("B") data, and the data may be a digital type of data.

The voltage generating part 220 generates a driving voltage to be provided to the panel driving part 200 and the display panel 100. In an exemplary embodiment, for example, the voltage generating part 220 provides the data driving part 240 with a digital source voltage and a analog source voltage, provides the gate driving part 250 with a gate on voltage and a gate off voltage, and provides the display panel 100 with a storage common voltage and the liquid crystal common voltage VCOM.

The kickback compensation part 230 includes a memory 231 and a lookup table ("LUT") part 235. The kickback compensation part 230 compensates first data applied to the first pixel column C1 including the first pixel P1 by using second data applied to the second pixel column C2 including the second pixel P2 to compensate for the kickback deviation between the first pixel P1 and the second pixel P2. In this case, the first pixel column C1 is disposed between the sub-lines SL1 and SL2 of the first gate line GL1 and the second pixel column C2 adjacent to the first pixel column C1 is disposed to the second sub-line SL2 of the second gate line GL2 as shown in FIG. 2.

In an exemplary embodiment, the memory 231 stores data corresponding to the first pixel P1 and the second pixel P2 electrically connected to the N-th gate line and the (N+1)-th gate line, e.g., the first gate line GL1 and the second gate line GL2, respectively, as shown in FIG. 2. In addition, in an exemplary embodiment, the memory 231 stores the data corresponding to four of the pixel columns according to one gate line comprising a pair of sub-lines electrically connected to two of the pixel columns.

The LUT part 235 stores first compensation data corresponding to the first pixel column C1 electrically connected to the N-th gate line and disposed between the sub-lines SL1 and SL2 of the N-th gate line. For example, the LUT part 235 stores the first compensation data mapped by the first data applied to the first pixel column C1 and the second data applied to the second pixel column C2 in a table format. The LUT part 235 outputs the first compensation data based on the first and second data received from the memory 231.

For example, the polarity of the first data may be different from the polarity of the second data. When the first data has a first polarity and the second data has a second polarity opposite phase to that of the first polarity, the LUT part 235 may include first and second compensation data respectively corresponding to the first and second polarities.

In an exemplary embodiment, the data driving part 240 is disposed along the latitudinal side 103 in the second direction of the display panel 100 and outputs the data voltages to the data lines DL. The data driving part 240 converts digital data provided from the kickback compensation part 230 to an analog data voltage so that the analog data voltage is outputted to the display panel 100. The data driving part 240 provides the pixels P connected to the gate lines GL with the data voltages for 1 horizontal period ("1H").

In an exemplary embodiment, for example, as shown in FIG. 2, a first data line DL1 provides the second pixel P2 with a data voltage of a first polarity, e.g., a positive ("+") polarity, and the second pixel P2 is disposed to the left of a third pixel P3 connected to a second gate line GL2. A second data line DL2 provides the third pixel P3 with a data voltage having a second polarity, e.g., a negative ("–") polarity, having an opposite phase to a phase of the first polarity. Additionally, the first data line DL1 may provide the first pixel P with a data voltage of the first polarity (+), and the first pixel P1 is disposed toward the left of the second pixel P2.

The gate driving part 250 is disposed along the longitudinal side 101 in the first direction of the display panel 100 and outputs gate signals to the gate lines GL. The gate driving part 250 generates the gate signals by using the gate on voltage and the gate off voltage. Each of the gate signals is a pulse signal having a pulse width corresponding to 1H. The gate driving part 250 outputs the gate signals to the gate lines GL1, GL2, GL3, . . . , and GLn.

In an exemplary embodiment, the gate driving part 250 is disposed directly on the display panel 100. The gate driving part 250 includes a plurality of thin-film transistors ("TFTs") (not shown) formed through a same process as forming TFTs, e.g., the switching devices, of the pixels P of the display panel 100. The gate driving part 250 according to an exemplary embodiment is a chip or, alternatively, a tape carrier package ("TCP"), and may be disposed on the display panel 100.

Figure 4:
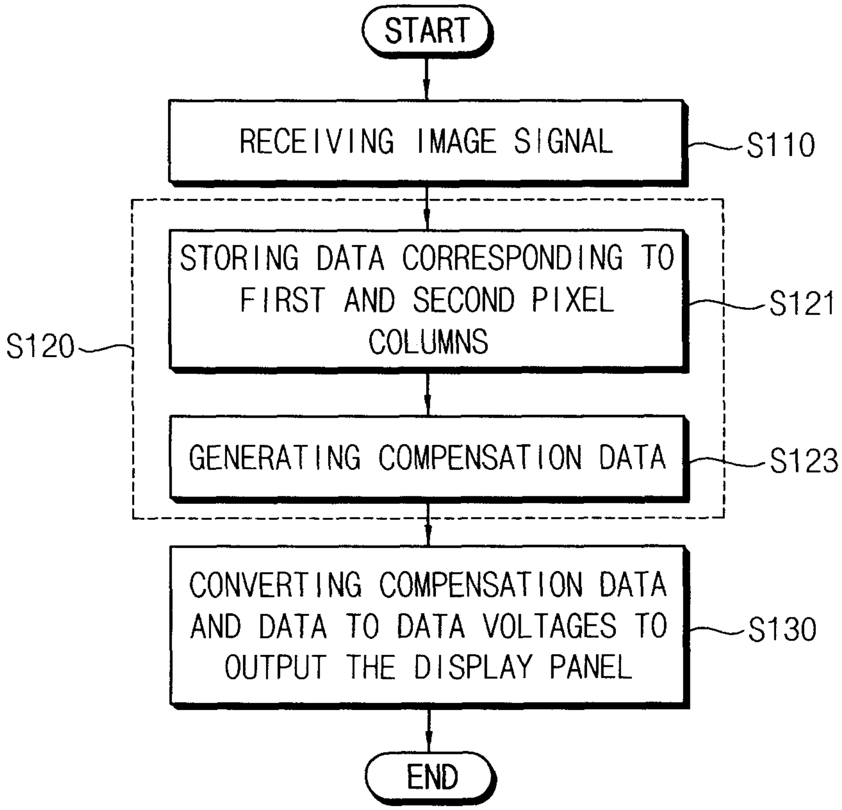
FIG. 4 is a flowchart illustrating an exemplary embodiment of a method of driving the display apparatus shown in FIG. 1.
Figures 5, 6:
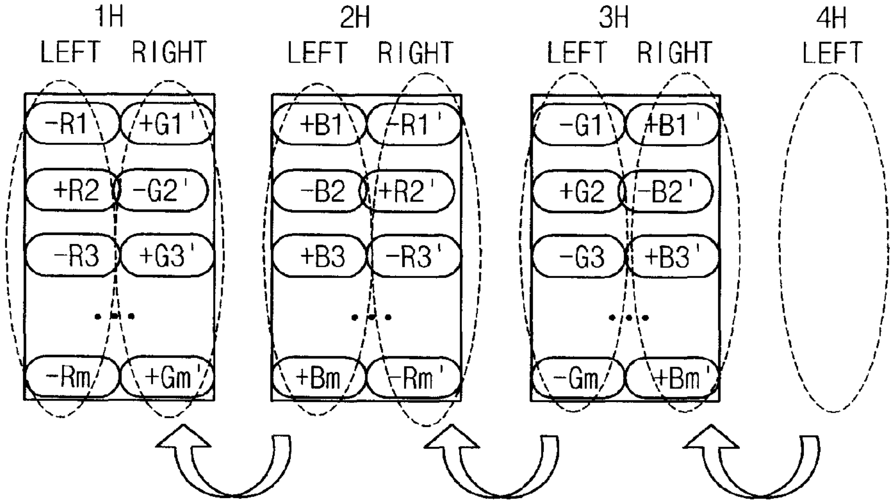
FIG. 5 is a table illustrating data stored in an exemplary embodiment of a lookup table part of the display apparatus shown in FIG. 1.
FIG. 6 is a table illustrating input data of a data driving part of the display apparatus shown in FIG. 1.

FIG. 4 is a flowchart illustrating an exemplary embodiment of a method of driving the display apparatus shown in FIG. 1. FIG. 5 is a table illustrating an exemplary embodiment of data stored in a look up table part of the display apparatus shown in FIG. 1. FIG. 6 is a table illustrating input data of a data driving part of the display apparatus shown in FIG. 1.

Referring to FIGS. 1, 2 and 4, the timing control part 210 receives an image signal, e.g., the digital image data, in step S110. The kickback compensation part 230 generates compensation data applied to the first pixel column C1 that is disposed between the sub-lines SL1 and SL2 of the first gate line GL1 so that the kickback voltage of the first pixel column C1 caused by a changing voltage of the second pixel column C2 disposed toward the right of the first pixel column C1 may compensate the kickback voltage (step S120).

In Step S120, in which the compensation data is generated, the data, corresponding to the first and second pixel columns C1 and C2 electrically connected to the first gate line GL1 and the second gate line GL2, respectively, is stored in the memory 231 (step S121). The timing control part 210 readouts the first and second data of the first and second pixel columns C1 and C2 from the memory 231 to provide the data to the LUT part 235. The LUT part 235 outputs the first or second compensation data of the first pixel column C1 from the corresponding LUT according to the polarity of the first and second data (step S123).

FIG. 5 is a LUT according to an example stored in the LUT part 235. Referring to FIG. 5, the data of the first pixel P1 is '16', the data of the second pixel P2 is '24', and the LUT part 235 receives the data '16' and '24'. The LUT part 235 outputs the compensation data '15' of the first pixel P1 to which the data '16' and '24' are mapped. The LUT part 235 may only store the compensation data corresponding to sampled data among 6-bit data 0, 8, 16, . . . , and 64. The compensation data corresponding to the remaining data may be calculated using various interpolation methods.

The kickback compensation part 230 outputs the first compensation data compensating the first data corresponding to the first pixel column C1 and outputs intact the second data corresponding to the second pixel column C2.

The data driving part 240 converts the digital data provided from the kickback compensation part 230 to analog data. The data driving part 240 outputs the data voltages of the analog data to the display panel 100 (step S130).

For example, referring to FIG. 6, the data driving part 240 receives the data corresponding to the pixels connected to the first gate line GL1 for 1H. The pixels connected to the first gate line GL1 comprise two of the pixel columns. The data driving part 240 receives normal data –R1, +R2, –R3, . . . , –Rm (wherein m is a natural number) corresponding to the pixels of the pixel column disposed toward the left of two of the pixel columns and compensation data +G1', –G2', +G3', . . . , and +Gm' for compensating for kickback deviation corresponding to the pixels of the pixel column disposed toward the right of two of the pixel columns.

Likewise, the data driving part 240 receives the data corresponding to pixels P of two for the pixel columns connected to the second gate line GL2 for the next 1 horizontal period. Specifically, the data driving part 240 receives normal data +B1, –B2, +B3, . . . , and +Bm corresponding to the pixels P of the pixel column disposed toward the left of two of the pixel columns and compensation data –R1', +R2', –R3', . . . , and –Rm' for compensating for kickback deviation corresponding to the pixels P of the pixel column disposed toward the right of two of the pixel columns.

The compensation data +G1', –G2', +G3', . . . , and +Gm' corresponding to the pixels P connected to the first gate line GL1 are generated based on the normal data +B1, –B2, +B3, . . . , and +Bm corresponding to the pixels connected to the second gate line GL2.

As described above, the data driving part 240 repeatedly receives data and converts the data to data voltages to output the data voltages to the data lines DL1, DL2, DL3, . . . , and DLm for each horizontal period 1H.

The gate driving part 250 sequentially outputs the gate signals to the gate lines GL1, GL2, GL3, . . . , and GLn based on a timing of the data voltages outputted from the data driving part 240. For example, for 1H during which the first gate line GL1 is provided with the gate signal, the data driving part 240 outputs the data +R1, +R2, –R3, . . . , –Rm, +B1, –B2, +B3, . . . , and +Bm corresponding to the pixels P connected to the first gate line GL1.

Figure 7:
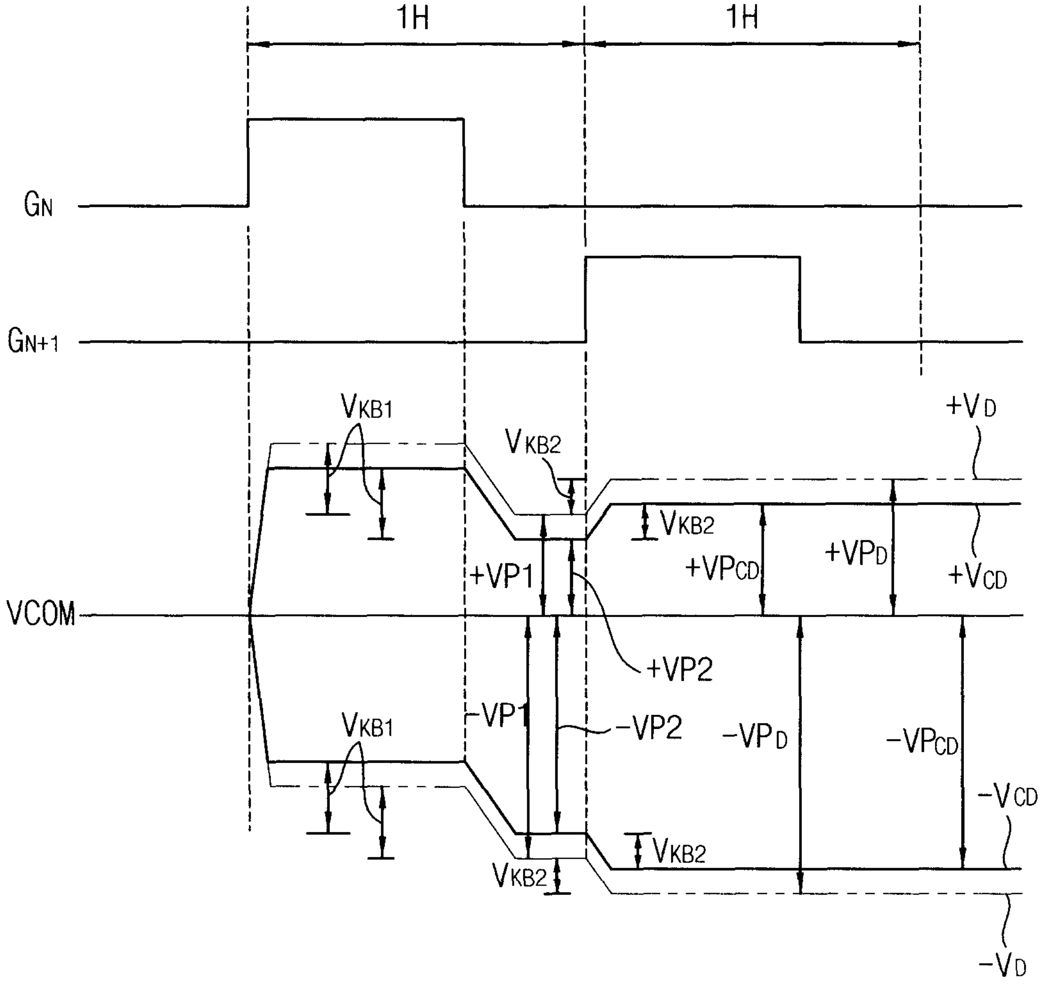
FIG. 7 is a signal timing diagram illustrating an exemplary embodiment of a signal provided to a first pixel of the display panel shown in FIG. 2.

FIG. 7 is a signal timing diagram illustrating an exemplary embodiment of a signal provided to a first pixel of the display panel shown in FIG. 2.

Referring to FIGS. 2 and 7, for purposes of description, a case in which the first pixel P1 included in the first pixel column C1 receives a data voltage having the first polarity, e.g., the positive polarity +, as well a case in which the first pixel P1 receives a data voltage having the second polarity, e.g., the negative polarity –, will be described.

The case in which the first pixel P1 receives the data voltage of the first polarity +will now be explained in further detail with reference to FIG. 7. More specifically, the first pixel P1 receiving a first data voltage $+V_D$ not compensated for the kickback deviation will be explained in comparison with the first pixel P1 receiving a first compensation data voltage $+V_{CD}$ compensated for the kickback deviation. The first compensation data voltage $+V_{CD}$ has a level lower than a level of the first data voltage $+V_D$, as shown in FIG. 7.

Hereinafter, a method of driving the first pixel P1 will be explained when the first pixel P1 receives the first data voltage $+V_D$ not compensated for the kickback deviation.

The first pixel P1 is provided with a high pulse of a gate signal $G_N$ transmitted through the N-th gate line $GL_N$, the first pixel P1 charges to the first data voltage $+V_D$. The high pulse of the gate signal $G_N$ has a pulse width corresponding to 1H. At the falling edge of the gate signal $G_N$, the first data voltage $+V_D$, charged by the first pixel P1, is dropped as a first kickback voltage $V_{ii}$ by the coupling capacitance CGS (Table 1) generated between the gate electrode and the source electrode of the switching element of the first pixel P1. Thus, the first pixel P1 charges a pixel voltage $+V_{P1}$. At the rising edge of the gate signal $G_{N+1}$ transmitted through the (N+1)-th gate line $GL_{N+1}$, the pixel voltage +VP1 charged by the first pixel P1 is boosted as a second kickback voltage $V_{KB2}$ by the coupling capacitance CPP generated between the adjacent pixel electrode of the first pixel P1 and the second pixel P2. Thus, the first pixel P1 charges to a boosted pixel voltage $+V_{PD}$. Therefore, the first pixel P1 holds the boosted pixel voltage $+V_{PD}$, greater than the pixel voltage +VP1 for one frame.

Hereinafter, an exemplary embodiment of a method of driving the first pixel P1 will be explained when the first pixel P1 receives the first data voltage $+V_{CD}$ compensated for the kickback deviation.

When the first pixel P1 is provided with a high level of the gate signal $G_N$ transmitted through the N-th gate line $GL_N$, the first pixel P1 charges to the first compensation data voltage $+V_{CD}$ which is lower than the first data voltage $+V_D$. At the falling edge of the gate signal $G_N$, the first compensation data voltage $+V_{CD}$ charged by the first pixel P1 is dropped as a first kickback voltage $V_{KB1}$ by the coupling capacitance CGS generated between the gate electrode and the source electrode. Thus, the first pixel P1 charges a pixel voltage $+V_{P2}$ which is less than the pixel voltage $+V_{P1}$. At the rising edge of the gate signal $G_{N+1}$ transmitted through the (N+1)-th gate line $GL_{N+1}$, the pixel voltage $+V_{P2}$ charged by the first pixel P1 is boosted as a second kickback voltage $V_{KB2}$ by the coupling capacitance CPP generated between the adjacent pixel electrodes. Thus, the first pixel P1 charges to a boosted pixel voltage $+V_{PCD}$. Therefore, the first pixel P1 holds the boosted pixel voltage $+V_{PCD}$, which is substantially the same as the pixel voltage +VP1, for one frame.

Thus, the first pixel P1 displays a luminance level greater than, e.g., brighter than, an original luminance level in the display panel 100 operating in a normally black mode when the first pixel P1 is provided with the normal data not compensated for kickback deviation. However, in an exemplary embodiment, the first pixel P1 displays the original luminance in the display panel 100 when the first pixel P1 is provided with the compensation data compensated for the kickback deviation.

Hereinafter, the case in which the first pixel P1 receives the data voltage of the second polarity – will be described in further detail with reference to FIG. 7. More specifically, the first pixel P1 receiving a first data voltage –VD not compensated for the kickback deviation will be explained in comparison with the first pixel P1 receiving a first compensation data voltage $-V_{CD}$ for the kickback deviation according to an exemplary embodiment. The first compensation data voltage $-V_{CD}$ has a level greater than a level of the first data voltage $-V_D$.

Hereinafter, a method of driving the first pixel P1 will be described when the first pixel P1 receives the first data voltage $-V_D$ not compensated for the kickback deviation.

When the first pixel P1 is provided with a high pulse of the gate signal $G_N$ transmitted through the N-th gate line $GL_N$, the first pixel P1 charges the first data voltage $-V_D$. The high pulse of the gate signal $G_N$ has a pulse width corresponding to 1H. At the falling edge of the gate signal $G_N$, the first data voltage $-V_D$ charged to the first pixel P1 is dropped as a first kickback voltage $V_{KB1}$ by the coupling capacitance CGS generated between the gate electrode and the source electrode of the switching element of the first pixel P1. Thus, the first pixel P1 charges a pixel voltage –VP1. At the rising edge of the gate signal $G_{N+1}$ transmitted through the (N+1)-th gate line $GL_{N+1}$, the pixel voltage –VP1 charged by the first pixel P1 is dropped as a second kickback voltage $V_{KB2}$ by the coupling capacitance CPP generated between the adjacent pixel electrodes of the first pixel and the second pixel. Thus, the first pixel P1 charges to a dropped pixel voltage $-V_{PD}$. Therefore, the first pixel P1 holds the dropped pixel voltage $-V_{PD}$, which is greater than the pixel voltage –VP1 for one frame.

Hereinafter, an exemplary embodiment of a method of driving the first pixel P1 will be described when the first pixel P1 receives the first data voltage $-V_{CD}$ compensated for the kickback deviation.

When the first pixel P1 is provided with a high level of the gate signal $G_N$ transmitted through the N-th gate line $GL_N$, the first pixel P1 charges the first compensation data voltage $-V_{CD}$ which is greater than the first data voltage $-V_D$. At the falling edge of the gate signal $G_N$, the first compensation data voltage $-V_{CD}$ charged by the first pixel P1 is dropped as a first kickback voltage $V_{KB1}$ by the coupling capacitance CGS generated between the gate electrode and the source electrode. Thus, the first pixel P1 charges a pixel voltage –VP2 which is greater than the pixel voltage –VP1. At the rising edge of the gate signal $G_{N+1}$ transmitted through the (N+1)-th gate line $GL_{N+1}$, the pixel voltage –VP2 charged by the first pixel P1 is dropped as a second kickback voltage $V_{KB2}$ by the coupling capacitance CPP generated between the adjacent pixel electrodes of the first pixel P1 and the second pixel P2. Thus, in an exemplary embodiment, the first pixel P1 charges a boosted pixel voltage $-V_{PCD}$. Therefore, the first pixel P1 holds the boosted pixel voltage $-V_{PCD}$ which is substantially the same as the pixel voltage –VP1 for one frame.

Thus, the first pixel P1 displays a luminance level which is greater that, e.g., higher than, an original luminance level in the display panel 100 operating in a normally black mode when the first pixel P1 is provided with the normal data not compensated for the kickback deviation. However, in an exemplary embodiment, the first pixel P1 displays the original luminance in the display panel 100 when the first pixel P1 is provided with the compensation data compensated for the kickback deviation.

Figure 8:
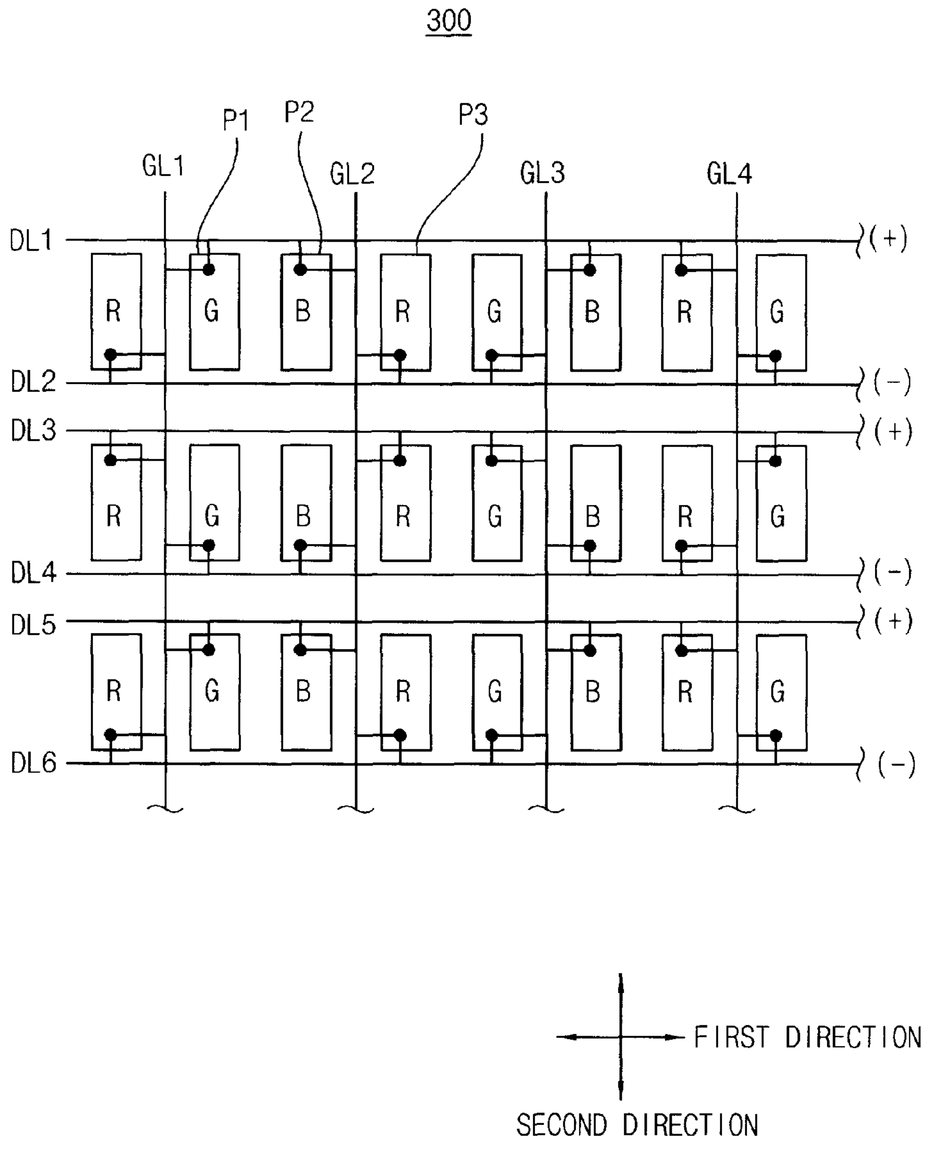
FIG. 8 is a plan view of an alternative exemplary embodiment of a display panel according the present invention.

FIG. 8 is a plan view of an alternative exemplary embodiment of a display panel according to the present invention. The same or like components in FIGS. 1 and 8 are labeled with the same reference characters, and any repetitive detailed description thereof will hereinafter be omitted or simplified.

Referring to FIGS. 1 and 8, a display panel 300 includes an array structure of gate lines which substantially improves an aperture ratio.

The gate lines GL1, GL2, GL3, . . . , and GLn extend along the latitudinal side 103 of the display panel 100 in the second direction, and are sequentially arranged along the longitudinal side 101 of the display panel 100 in the first direction. The gate lines GL1, GL2, GL3, . . . , and GLn are electrically connected to pixels P in the pixel columns, as described above in greater detail. Specifically, one gate line is disposed between two adjacent pixel columns, and is electrically connected to pixels P of the two adjacent pixel columns. Specifically, second gate line GL2, for example, is disposed between a second pixel P2 and a third pixel P3, adjacent to the second pixel P2, and is electrically connected to the second pixel P2 and the third pixel P3, as shown in FIG. 8. Accordingly, in an exemplary embodiment, a gate line is not required between a first pixel P1 and the second pixel P2. Thus, an aperture ratio is substantially improved.

The data lines DL1, DL2, DL3, . . . , and DLm extend along the longitudinal side 101 of the display panel 100 in the first direction, and are arranged along the latitudinal side 103 of the display panel 100 in the second direction. The data lines DL1, DL2, DL3, . . . , and DLm are electrically connected to the pixels P of the pixel rows. For example, data first data line DL1 and a second data line DL2 are electrically connected to the pixels P of one pixel row. The first data line DL1 and the second data line DL2 are provided with data voltages having opposite phases. The pixels P of one pixel row are selectively connected to the first data line DL1 and the second data line to be driven by an inversion driving method.

A method of driving a display panel 300 according to the embodiment is substantially the same as the method of the previous example embodiment described above with reference to the display panel 100, and any repetitive description thereof has been omitted.

Figure 9:
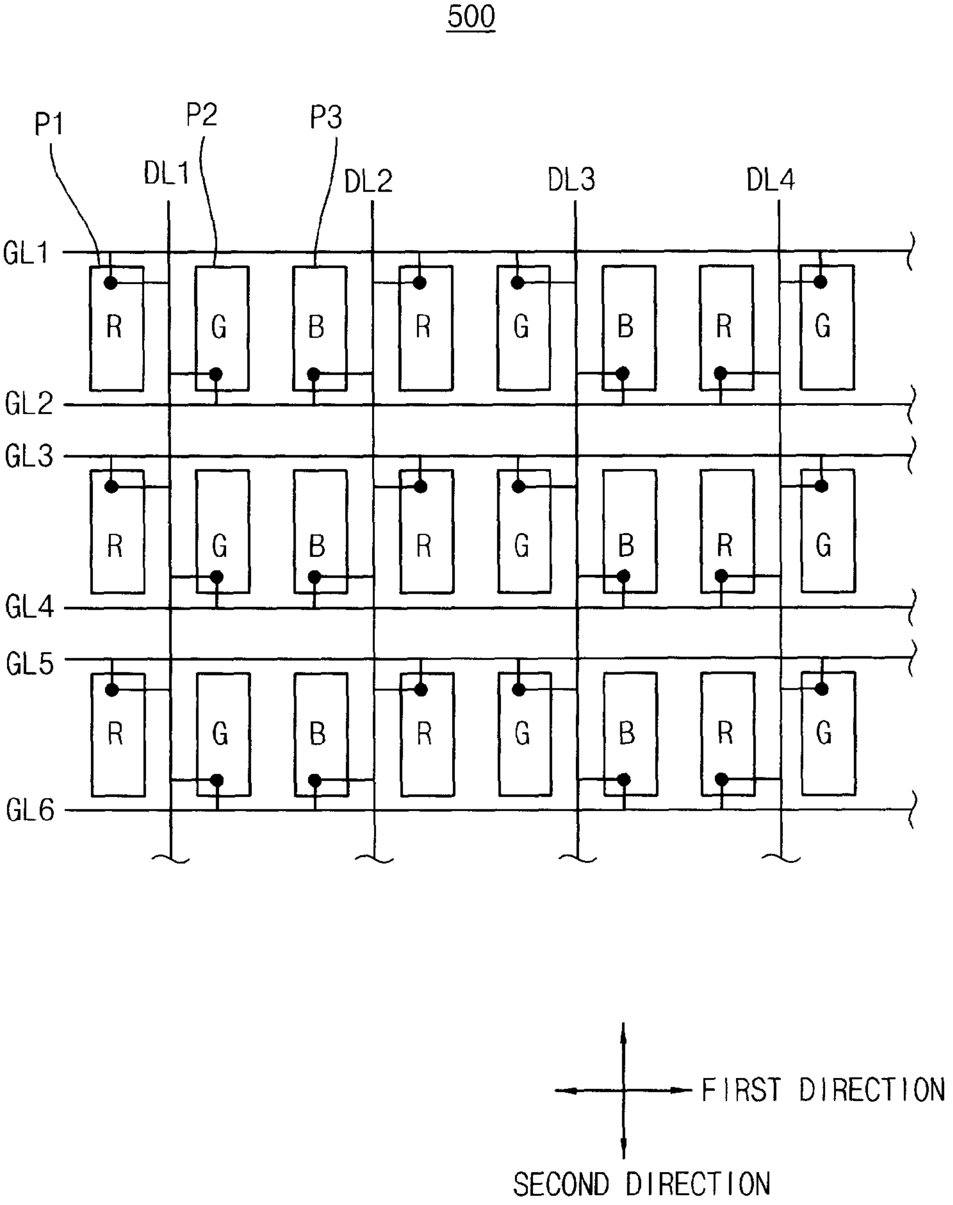
FIG. 9 is a plan view of an another alternative exemplary embodiment of a display panel according to the present invention.

FIG. 9 is a plan view of another alternative exemplary embodiment of a display panel according to the present invention. The same or like components in FIGS. 1 and 9 are labeled with the same reference characters, and any repetitive detailed description thereof will hereinafter be omitted or simplified.

Referring to FIGS. 1 and 9, a display apparatus according to an alternative exemplary embodiment includes a display panel 500 and a panel driving part 200.

The display panel 500 includes a first pixel P1 and a second pixel P2, gate lines GL1, GL2, GL3, . . . , and GLn and of data lines DL1, DL2, DL3, . . . , and DLm.

The gate lines GL1, GL2, GL3, . . . , GLn extend along the longitudinal side 101 of the display panel 100 in the first direction, and are sequentially disposed along the latitudinal side 103 of the display panel 100 in the second direction. Adjacent gate lines are electrically connected to pixels P of a pixel row. For example, a first gate line GL1 of the pair of gate lines is electrically connected to the first pixel P1, and a second gate line GL2 of the pair of gate lines is electrically connected to the second pixel P2 and a third pixel P3, as shown in FIG. 9.

The data lines DL1, DL2, DL3, . . . , and DLm extend along the latitudinal side 103 of the display panel 100 in the second direction, and are sequentially disposed along the longitudinal side 101 of the display panel 100 in the first direction. Each of the data lines DL1, DL2, DL3, . . . , and DLm is electrically connected to pixels P of two of the pixel columns. For example, as shown in FIG. 19, a first data line DL1 is disposed between the first pixel P1 and the second pixel P2, and is electrically connected to the first pixel P1 and the second pixel P2.

The first pixel P1 and the second pixel P2, as described in greater detail above with reference to Table 1, cause the kickback deviation by the coupling capacitance CGS, the coupling capacitance CGP and the coupling capacitance CPP. Therefore, in an exemplary embodiment, a kickback compensation part 230 (FIG. 1) compensates for the kickback deviation between the first pixel P1 and the second pixel P2.

Specifically, the kickback compensation part 230 includes a memory 231 and an LUT part 235. The memory 231 stores a plurality of data corresponding to the pixels P electrically connected to the N-th and (N+1)-th gate lines $GL_N$ and $GL_{N+1}$, respectively. The memory 231 stores the data corresponding to the pixels P of one pixel row.

The LUT part 235 stores first compensation data corresponding to the first pixel P1 electrically connected to the N-th gate line $GL_N$, e.g., the first gate line GL1 in FIG. 9. For example, the LUT part 235 may store the first data of the first pixel P1, the second data of the second pixel P2, and the first compensation data of the first pixel P1 to which the first data and the second data are mapped in a table format (FIG. 5). The LUT part 235 receives the first data and the second data from the memory 231, and outputs the first compensation data of the first pixel P1.

The LUT part 235 includes a first LUT which stores the first compensation data having a first polarity and a second LUT which stores the first compensation data having a second polarity having an opposite phase to a phase of the first polarity.

In an exemplary embodiment, the data driving part 240 is disposed along the longitudinal side 101 of the display panel 100, and the gate driving part 250 is disposed along the latitudinal side 103 of the display panel 100.

An exemplary embodiment of a method of driving the display panel 500 is substantially the same as described above with reference to FIGS. 4 to 7, and any repetitive detailed description thereof has been omitted. It will be note that, referring to FIG. 7, a pulse width of the gate signal according to the exemplary embodiments described above with reference to FIGS. 4 to 7 corresponds to 1 horizontal period (H), whereas a pulse width of the gate signal according to the alternative exemplary embodiment shown in FIG. 9 corresponds to ½H, e.g., one half of a horizontal period. Thus, the pixels P of the pixel row electrically connected to the N-th and (N+1)-th gate lines $GL_N$ and $GL_{N+1}$, respectively, both charge the data voltages for 1H.

Figure 10:
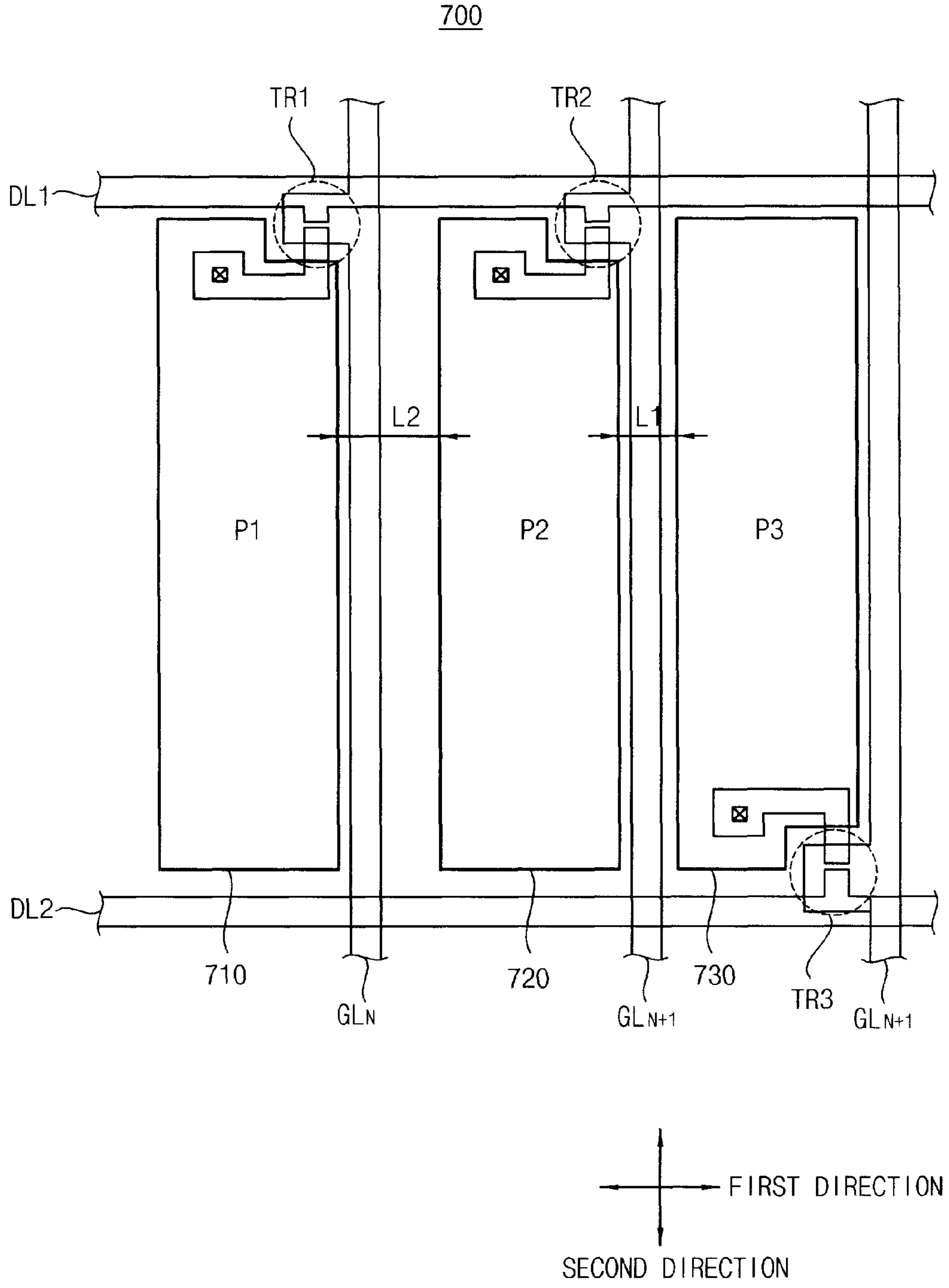
FIG. 10 is a plan view of yet another alternative exemplary embodiment of a display panel according to the present invention.

FIG. 10 is a plan view of yet another alternative exemplary embodiment of a display panel according to the present invention. The same or like components in FIGS. 1, 2 and 10 are labeled with the same reference characters, and any repetitive detailed description thereof will hereinafter be omitted or simplified.

Referring to FIGS. 2 and 10, a display panel 700 according to an exemplary embodiment has a line array structure substantially the same as the line array structure of the display panel 200 described in greater detail above and shown FIG. 2, except that a distance L2 between a first pixel electrode 710 and a second pixel electrode 720 of the first pixel P1 and the second pixel P2, respectively, is different from a distance L1 between the second pixel electrode 720 and a third pixel electrode 730 of the second pixel P2 and a third pixel P3, respectively. The first pixel P1 is electrically connected to an N-th gate line $GL_N$, the second pixel P2 is electrically connected to an (N+1)-th gate line $GL_{N+1}$ and the third pixel P3 is electrically connected to the (N+1)-th gate line $GL_{N+1}$.

In an exemplary embodiment, the first pixel P1 includes a first switching element TR1 connected to the N-th gate line $GL_N$ and a first data line DL1 and the first pixel electrode 710. The second pixel P2 includes a second switching element TR2 connected to the (N+1)-th gate line $GL_{N+1}$ and the first data line DL1 and the second pixel electrode 720. The third pixel P3 includes a third switching element TR3 connected to the (N+1)-th gate line $GL_{N+1}$ and a second data line DL2 and the third pixel electrode 730.

The distance L1 between the second pixel electrode 720 and the third pixel electrode 730, e.g., a first distance L1, is smaller than the distance L2 between the first pixel electrode 710 and the second pixel electrode 720, e.g., a second distance L2. Thus, the second distance L2 is longer than the first distance L1.

The first pixel P1 charges a first data voltage transmitted through the first data line DL1 when the N-th gate line $GL_N$ receives the high pulse of the gate signal. When the (N+1)-th gate line $GL_{N+1}$ receives the high pulse of the gate signal and the first data line DL1 receives a second data voltage, the coupling capacitance CPP is generated between the first pixel electrode 710 and the second pixel electrode 720. The coupling capacitance CPP causes the kickback voltage, as described in greater detail above. As a result, the first data voltage charged in the first pixel P1 changes by the kickback voltage. Thus, in an exemplary embodiment, the first distance L1 and the second distance L2 are different from each other, and the kickback deviation of the first pixel P1, the second pixel P2 and the third pixel P3 is substantially reduced and/or effectively eliminated.

Thus, a panel driving part 200 (FIG. 1) for driving the display panel 700 according to an alternative exemplary embodiment may omit the kickback compensation part 230 for compensating for the kickback deviation. Hereinafter, a method of driving the display panel 700 according to an alternative exemplary embodiment will be described in further detail with reference to FIG. 1.

The timing control part 210 provides the data driving part 240 with image data based on horizontal line units. The data driving part 240 converts the image data in the horizontal line units to data voltages in the horizontal line units and provides the display panel 700 with the data voltages in the horizontal line unit.

The gate driving part 250 generates gate signals using the gate on voltage and the gate off voltage and outputs the gate signals to the display panel 700. The data driving part 240 is disposed along the longitudinal side 101 (FIG. 1) of the display panel 700 (FIG. 10) and the gate driving part 250 is disposed along the latitudinal direction 103 (FIG. 1) of the display panel 700 (FIG. 10).

In an exemplary embodiment, the first through third pixels P1, P2 and P3, respectively, of the display panel 700 charges the data voltages. The second distance L2 between the first electrode 710 and the second pixel electrode 720 is large compared to the first distance L1, and the coupling capacitance CPP between the first pixel electrode 710 and the second pixel electrode 720 is small compared to the coupling capacitance CPP between the second pixel electrode 720 and the third pixel electrode 730. More particularly, the first distance L1 between the second pixel electrode 720 and the third pixel electrode 730 is small (compared to the second distance L2) and the coupling capacitance CPP between the second pixel electrode 720 and the third pixel electrode 730 is relatively large. Thus, the kickback deviation of the first through third pixels P1, P2 and P3, respectively, is substantially reduced and/or effectively eliminated.

As described herein, the display panel 700 according to an exemplary embodiment has the line array structure substantially the same as the line array structure described in greater detail above, except that distances between different pairs of adjacent pixel electrodes are different. Accordingly, the kickback deviation is compensated in the display panel 700 according to an exemplary embodiment.

Thus, according to exemplary embodiments of the present invention, first and second pixels adjacent to each other and electrically connected to gate lines different from each other compensate for a kickback deviation, and afterimages as well as vertical stripe patterns are substantially reduced and/or effectively prevented in a display apparatus.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A method of driving a display panel including a plurality of data lines, a plurality of gate lines, a first pixel column electrically connected to an N-th gate line and a second pixel column electrically connected to an (N+1)-th gate line adjacent to the N-th gate line, the method comprising (wherein N is a natural number):

generating compensation data of the first pixel column for compensating for a kickback deviation between the first and second pixel columns based on first data and second data corresponding to the first and second pixel columns, respectively; and converting the compensation data of the first pixel column and the second data of the second pixel column to data voltages of an analog type to output the data voltages to the data lines.

2. The method of claim 1, wherein generating compensation data of the first pixel column comprises:

storing the first and second data corresponding to the first and second pixel columns; and generating the compensation data using a lookup table (LUT), the compensation data corresponding to the first and second data being mapped in the LUT.

3. The method of claim 2, wherein each of the N-th and (N+1)-th gate lines receives a gate signal having a pulse width corresponding to 1H (H is a horizontal period) in sequence.

4. The method of claim 1, wherein each of the N-th and (N+1)-th gate lines include a pair of sub-lines electrically connected to each other.

5. The method of claim 4, wherein the first pixel column is disposed between the sub-lines of the N-th gate line.

6. The method of claim 5, wherein the second pixel column is disposed to one side of the (N+1)-th gate line.

7. The method of claim 1, wherein the data lines are extended in a longitudinal side of the display panel and the gate lines are extended in a latitudinal side of the display panel.

8. A display apparatus comprising:

a display panel including a plurality of data lines, a plurality of gate lines, a first pixel column electrically connected to an N-th gate line and a second pixel column electrically connected to an (N+1)-th gate line adjacent to the N-th gate line (wherein N is a natural number);

a kickback compensation part generating compensation data of the first pixel column for compensating for a kickback deviation between the first and second pixel columns based on first data and second data respectively applied to the first and second pixel columns;

a data driving part converting the compensation data of the first pixel column and the second data of the second pixel column to data voltages of an analog type to output the data voltages to the data lines; and a gate driving part outputting gate signals to the gate lines.

9. The display apparatus of claim 8, wherein the kickback compensation part comprises:

a memory storing the first and second data respectively corresponding to the first and second pixel columns; and an LUT part generating the compensation data of the first pixel column by using a LUT, compensation data corresponding to the first and second data being mapped in the LUT.

10. The display apparatus of claim 9, wherein the gate driving part applies a gate signal having a pulse width corresponding to 1H to each of the N-th and (N+1)-th gate lines (H is a horizontal period).

11. The display apparatus of claim 10, wherein the LUT part comprises:

a first LUT storing compensation data of a first polarity corresponding to data of the first polarity; and a second LUT storing compensation data of a second polarity having an opposite phase to that of the first polarity corresponding to data of the second polarity.

12. The display apparatus of claim 11, wherein the first and second data have the same polarity.

13. The display apparatus of claim 8, wherein each of the N-th and (N+1)-th gate lines include a pair of sub-lines electrically connected to each other.

14. The display apparatus of claim 13, wherein the first pixel column is disposed between the sub-lines of the N-th gate line.

15. The display apparatus of claim 14, wherein the second pixel column is disposed to one side of the (N+1)-th gate line.

16. The display apparatus of claim 8, wherein the data lines are extended in a longitudinal side of the display panel and the gate lines are extended in a latitudinal side of the display panel.

* * * * *